United States Patent
Chung et al.

(10) Patent No.: US 6,466,414 B1
(45) Date of Patent: Oct. 15, 2002

(54) CONTINUOUSLY WOUND FIBER-REINFORCED DISK DRIVE ACTUATOR ASSEMBLY

(75) Inventors: Gwendolyn Jones Chung; Wayne Imaino; Walter Lloyd Prater, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/650,255

(22) Filed: Aug. 29, 2000

(51) Int. Cl.$^7$ ................................................ G11B 5/55
(52) U.S. Cl. ................................. 360/265.7; 360/265.9
(58) Field of Search ............................ 360/265.7, 265.9

(56) References Cited

U.S. PATENT DOCUMENTS

| | | | |
|---|---|---|---|
| 3,473,900 A | * | 10/1969 | Sara |
| 3,894,863 A | * | 7/1975 | Lachman et al. |
| 3,957,272 A | * | 5/1976 | Yasuda |
| 4,145,471 A | * | 3/1979 | Kendall et al. |
| 4,223,075 A | * | 9/1980 | Harrigan, Jr. et al. |
| 4,390,382 A | * | 6/1983 | Matsuda et al. |
| 4,731,298 A | * | 9/1988 | Shindo et al. |
| 4,906,518 A | * | 3/1990 | Inabata |
| 4,929,513 A | * | 5/1990 | Kyono et al. |
| 5,111,870 A | * | 5/1992 | Cook |
| 5,111,871 A | * | 5/1992 | Cook |
| 5,319,512 A | * | 6/1994 | Grapenthin |
| 6,151,198 A | * | 11/2000 | Prater et al. ............. 360/265.7 |

FOREIGN PATENT DOCUMENTS

| | | | |
|---|---|---|---|
| JP | 56-16906 | * | 2/1981 |
| JP | 58-111101 | * | 7/1983 |
| JP | 61-242378 | * | 10/1986 |
| JP | 2-81377 | * | 3/1990 |
| JP | 5-174520 | * | 7/1993 |
| JP | 6-68481 | * | 3/1994 |
| JP | 8-315520 | * | 11/1996 |

OTHER PUBLICATIONS

IBM Technical Disclosure Bulletin, v.31 n.10,pp.395ff.*

* cited by examiner

*Primary Examiner*—Robert S. Tupper
(74) *Attorney, Agent, or Firm*—Liu & Liu (57) ABSTRACT

A near net shape fiber composite actuator assembly that requires little to no secondary finishing operations such as cutting or machining of the fiber structure to form the periphery of the assembly. In one aspect of the present invention, fibers are continuously wound substantially continuously in a direction along the periphery of the actuator component. This results in fibers orientated generally in the longitudinal direction of the component, and in a direction along the periphery of the matrix of the component, with fibers bending around all large radii to provide fiber continuity around the component's perimeter. Actuator positioner arms can be made of continuous fiber windings. An E-block can be made by stacking actuator arm components that are individually formed by continuous fiber windings. A dual-purpose wound-form can be deployed to facilitate the winding process, which will become an integral part of the final actuator assembly structure. Certain preformed actuator components such as coils and pivot bearing are used as mandrels to facilitate fiber windings, which will become integrated into the final actuator assembly in the winding process. In another aspect of the present invention, at the end of the fiber winding process, the fiber wound actuator assembly is applied as a preform, and further combined with a metal or polymer matrix to complete an E-block having fiber-reinforced metal or polymer matrix.

25 Claims, 10 Drawing Sheets

CONTINUOUSLY WOUND FIBER-REINFORCED DISK DRIVE ACTUATOR ASSEMBLY

BACKGROUND OF THE INVENTION

1. Field of the Invention

This invention relates generally to computer hard disk drive actuator assemblies and, more particularly, to the design and manufacturing process of fiber composite actuator assemblies.

2. Description of Related Art

Magnetic disk drives are information storage devices that utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and for maintaining the transducer over the data track center line during a read or a write operation. The magnetic media disk or disks in the disk drive are mounted to a spindle. The spindle is attached to a spindle motor, which rotates the spindle and the disks to provide read/write access to the various portions on the concentric tracks on the disks.

The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single positioner arm extending from a pivot point, or alternatively, a plurality of positioner arms arranged in a comb-like fashion extending from a pivot point, sometimes referred to as an "E-block." A rotary voice coil motor (VCM) is attached to the rear portion of the actuator assembly to power movement of the actuator over the disks.

During operation of the disk drive, the actuator is positioned radially over the disk surface under the control of a positioning servo system. The servo system is designed to accurately position the read/write transducer over a selected data track on the disk in as short a time as possible and to maintain the read/write transducer position over the data track as accurately as possible. As data storage density of disk drives increases, the radial density of data tracks on the disk increases. The ability of the servo system to accurately track on the resulting narrower data tracks becomes a limitation on the disk drive performance.

Actuator assemblies have resonant frequencies that can adversely affect the performance of the servo system. Low frequency resonances severely limit the bandwidth of the servo system, resulting in poor high frequency response and degraded disk drive performance. In addition, fast access to the information stored on the disks requires a low inertia positioner with a short settling time and good damping characteristics after positioning. So, with a fast servo for positioning, the positioner should be constructed to have high resonant frequencies with good signal following properties and a short response time.

A number of low density, high stiffness composites are available, which offer low inertia and ease of manufacturability compared to traditional aluminum, magnesium, or stainless steel actuator arms. The most common material used to overmold an actuator body around metal arms is a liquid crystal polymer filled with up to 30% short carbon fibers (see U.S. Pat. No. 5,656,877). This material, or a similar polymer composite, can be used for molding individual actuator arms (see IBM TDB Vol. 31, No. 10). The limitations of this liquid crystal polymer, when compared to traditional metals, include its poor stiffness and strength. This occurs because of (1) the low volume percentage (20–30%) of fiber, (2) fiber misalignment to the principal stress direction, and (3) the short fiber length. Although a number of composite materials are stiffer than the pure polymer matrix, they do not have sufficient stiffness to achieve the actuator design goal of a greater bandwidth of the servo system required for high tpi (track per inch) hard disk drives.

Recent constructions of an E-block have included a monolithic body, with integral positioning arms and integral carrier arms. A common method to manufacture a monolithic E-block is to bond together unidirectional fiber mats to form a thick laminate block. To achieve the desired E-block geometry, the laminate block is then machined. Machining away 50 to 70 percent of the carbon fiber composite block to create the actuator E-block produces a significant amount of scrap.

Another method to manufacture an E-block involves cutting a unidirectional fiber sheet to produce an individual arm for a stacked actuator configuration. By using this method, arm strength is severely compromised as a result of (1) cutting fibers to make a taper shaped arm, and (2) creating areas of weakness prone to cracking at the bearing bore hole and tooling holes as the axes of short fibers are oriented with the direction of bending. Stamping an arm out of a sheet of unidirectional fiber composite is risky because the thin arm (<1 mm) will easily crack along its long axis in the direction of the grain.

In Japanese Patent Publication JP 408315520A, the actuator is formed out of a fiber composite material, especially a carbon/carbon-based three-dimensional continuous fiber type composite material, which is also cut at its edges.

The weakening effect of cutting fibers is further illustrated in Japanese Patent Publication JP 2081377, which discloses winding around a pin fibers that have been treated with thermal hardening resin, after which they are cut to shape in the form of a HDD (hard disk drive) load beam. The cut edges are subsequently sealed in a secondary operation. The other cases without this additional step will generate exposed cut carbon fiber particles that will shed off of the E-block. When these fragments of carbon fiber become airborne, the disk drive's air turbulence allows them to migrate to the head-disk-interface, where they will cause data to be lost by initiating a head crash.

In Japanese Patent Publication JP 6-68481, carbon fiber composite carriage mechanisms for optical heads are manufactured by lay-up of prepreg woven mats of the fibers aligned in more than one direction. Although the fiber orientation is aligned in the respective layers with the direction of the torsion and bending stresses, stiffness is still compromised because of: (1) volumetric inefficiencies of woven mats, (2) material anisotropy of woven mats, and (3) reduced volumetric fraction of carbon fibers due to the layers of polymer separating the mats.

The low stiffness and strength of woven composites can be improved by using a unidirectional fiber direction. Unidirectional fiber mats typically have a 70 percent packing density, which is unachievable in woven mats. Despite this gain/improvement, unidirectional fiber composites are weak and compliant in the direction perpendicular to the fiber orientation. In addition, when laying up unidirectional fibers, it is difficult to achieve good fiber continuity throughout a part that has holes, that is non-rectangular, and that has complex three-dimensional geometry. Thus, the previous methods of manufacturing E-blocks are not desirable.

Designs have incorporated carbon fiber inserts to stiffen weak E-block arms. In one design (WO 96/07181), metal E-block arms are stiffened by adhesively bonding a U-channel shaped, fiber-reinforced composite preform to the edge of the arm. The increased thickness of the arm, which must fit within a tight disk-to-disk limitation, is clearly a disadvantage. Compact construction of the device requires minimal disk separation between the stacked disks.

It is therefore desirable to create a low density, low inertia composite actuator that has improved stiffness, strength and high damping characteristics, and overcomes the drawbacks in the prior art.

SUMMARY OF THE INVENTION

To overcome the shortcomings of the prior art described above, it is an object of the present invention to provide a near net shape fiber composite actuator assembly that requires little to no secondary finishing operations such as cutting or machining of the fiber structure to form the periphery of the assembly. It is another object of the present invention to provide an actuator assembly such as an E-block that is made of a composite material that is low in density and high in mechanical strength and stiffness, and relatively less costly to manufacture. It is another object of the present invention to provide a method of manufacturing (including winding) disk drive actuator components such as an E-block, of a fiber reinforced metal matrix composite or polymer matrix composite.

In one aspect of the present invention, to maximize the material's mechanical stiffness and strength, fibers are continuously wound to form the fiber composite actuator components. More specifically, fibers are wound substantially continuously in a direction along the periphery of the actuator component. This results in fibers orientated generally in the longitudinal direction of the component, and in a direction along the periphery of the matrix of the component, with fibers bending around all large radii to provide fiber continuity around the component's perimeter. Longitudinal fiber orientation and the higher fiber packing density, which can be easily achieved by winding, maximize both the in-plane bending stiffness (or sway mode stiffness) and the out-of-plane bending stiffness of an elongated member. Continuous winding also solves the lengthwise cracking problem associated with cutting. These advantages were not accomplished with laminated composites disclosed in the prior art.

In one embodiment of the present invention, an actuator positioner arm is made of a fiber composite material comprising continuous fiber windings in accordance with the present invention. In another embodiment of the present invention, an E-block is made by stacking actuator arm components that are individually formed by continuous fiber windings in accordance with the present invention. In another embodiment of the present invention, a dual-purpose wound-form is deployed to facilitate the winding process, which will become an integral part of the final actuator assembly structure. In yet another embodiment of the present invention, certain preformed actuator components such as coils and pivot bearing are used as mandrels to facilitate fiber windings, which will become integrated into the final actuator assembly in the winding process.

In another aspect of the present invention, at the end of the fiber winding process, the fiber wound actuator assembly is applied as a preform, and further combined with a metal or polymer matrix to complete an E-block having fiber-reinforced metal or polymer matrix.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

This invention is described in a preferred embodiment in the following description with reference to the Figures. While this invention is described in terms of the best mode for achieving this invention's objectives, it will be appreciated by those skilled in the art that variations may be accomplished in view of these teachings without deviating from the spirit or scope of the invention. This description is made for the purpose of illustrating the general principles of the invention and should not be taken in a limiting sense. The scope of the invention is best determined by reference to the appended claims.

Figure 1:
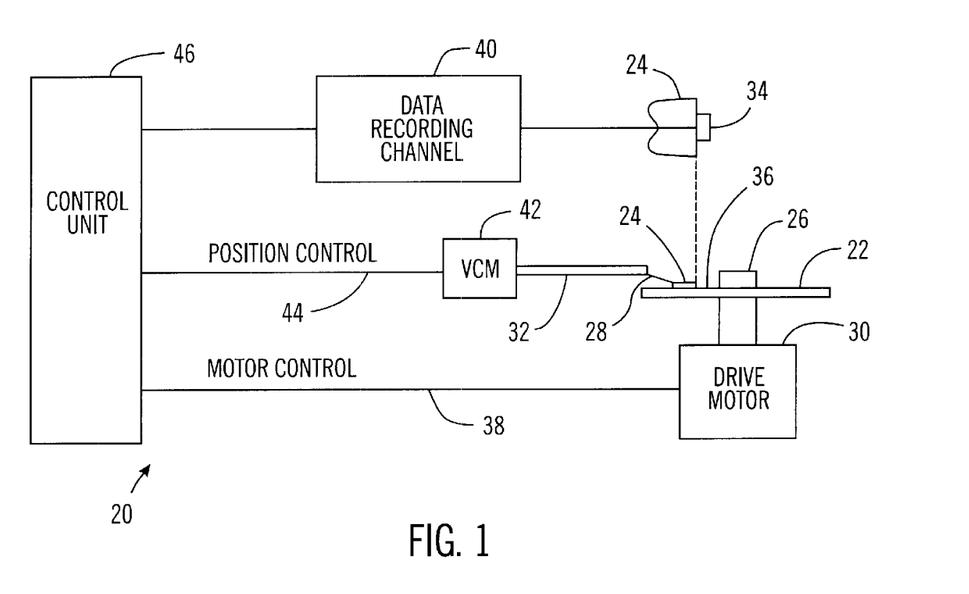
FIG. 1 is a simplified drawing of a magnetic recording disk drive system.

Referring now to FIG. 1, there is shown a disk drive 20 embodying the present invention. As shown in FIG. 1, at least one rotatable magnetic disk 22 is supported on a spindle 26 and rotated by a disk drive motor 30. The magnetic recording media on each disk is in the form of an annular pattern of concentric data tracks (not shown) on the disk 22.

At least one slider 24 is positioned on the disk 22, each slider 24 supporting one or more magnetic read/write heads 34. As the disks rotate, the slider 24 is moved radially in and out over the disk surface 36 so that the heads 34 may access different portions of the disk where desired data is recorded. Each slider 24 is attached to a positioner arm 32 by means of a suspension 28, to make a head gimbal assembly. In accordance with the present invention, the positioner arm 32 is made of a wound fiber reinforced material. The suspension 28 provides a slight spring force, which biases the slider 24 against the disk surface 36. Each positioner arm 32 is attached to a means of actuation 42. The means of actuation 42 as shown in FIG. 1 may be a voice coil motor (VCM). The VCM comprises a coil movable within a fixed magnetic field, the direction and speed of the coil movements being controlled by the position signals supplied by the control unit 46.

During operation of the disk storage system, the rotation of the disk 22 generates an air bearing between the slider 24 and the disk surface 36 which exerts an upward force or lift on the force of the suspension 28 and supports the slider 24 off and slightly above the disk surface by a small, substantially constant spacing during normal operation.

The various components of the disk storage system are controlled in operation by control signals generated by a control unit 46, such as access control signals and internal clock signals. Typically, the control unit 46 comprises logic control circuits, storage chips and a microprocessor. The control unit 46 generates control signals to control various system operations such as drive motor control signals on line 38 and head position and seek control signals on line 44. The control signals on line 44 provide the desired current profiles to optimally move and position the slider 24 to the desired data track on the disk 22. Read and write signals are communicated to and from the read/write heads 34 by means of a recording channel 40.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
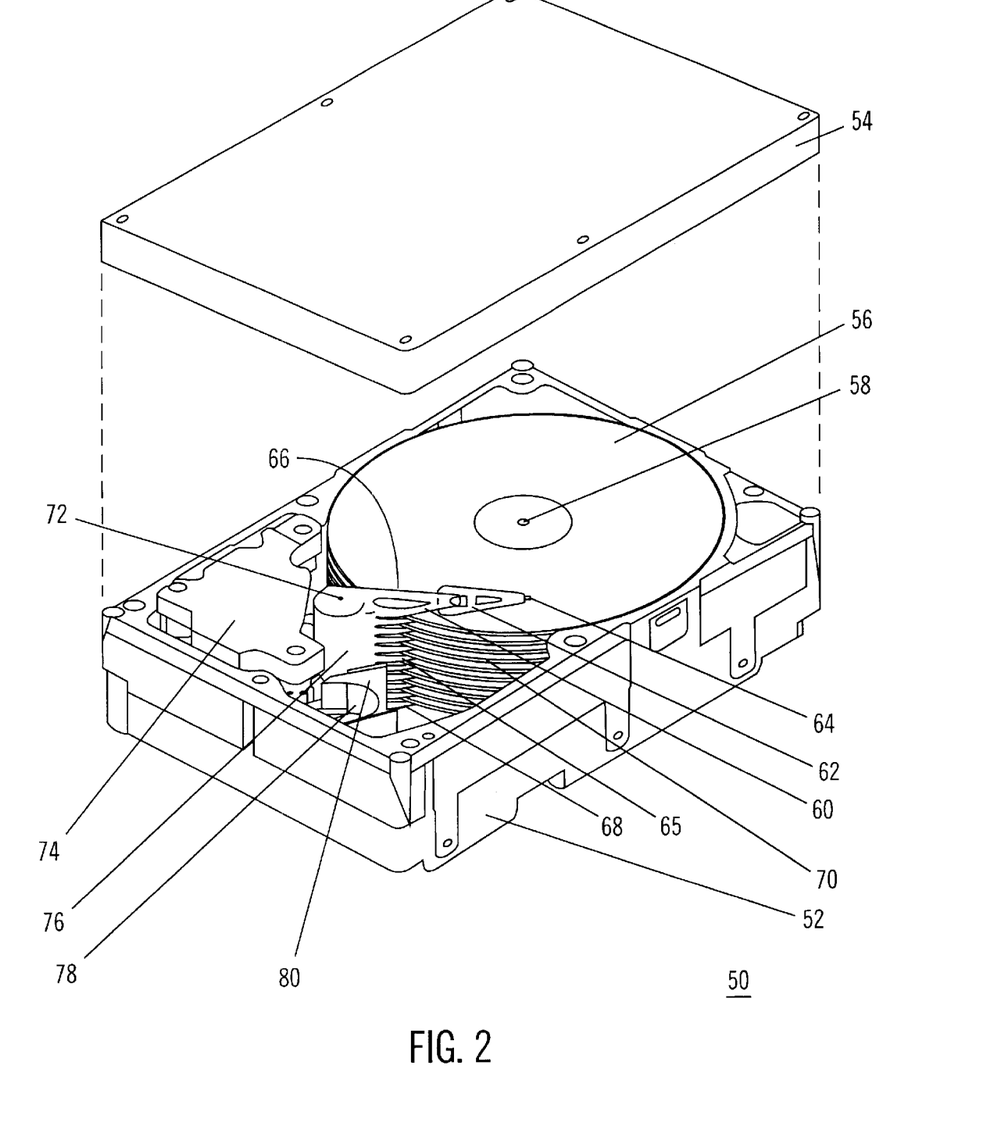
FIG. 2 is a perspective view of a disk drive.

FIG. 2 shows a hard disk drive 50 using a fiber composite actuator assembly 76 in accordance with the present invention. The cover 54 of the disk drive is shown exploded. In operation, the cover 54 would be disposed on top of the housing 52. The disk drive 50 comprises one or more magnetic disks 56. The disks may be conventional particulate or thin film recording disks, which are capable of storing digital data in concentric tracks. In a preferred embodiment, both sides of the disks 56 are available for storage, and it will be recognized by one of ordinary skill in the art that the disk drive 50 may include any number of such disks 56.

The disks 56 are mounted to a spindle 58. The spindle 58 is attached to a spindle motor (not shown), which rotates the spindle 58 and the disks 56 to provide read/write access to the various portions of the concentric tracks on the disks 56.

The actuator assembly 76 includes a positioner arm 60, and a suspension assembly 62. In accordance with the present invention, the actuator assembly comprises a fiber wound composite structure, which will be described in detail below. The suspension assembly 62 includes a slider/transducer assembly 64 at its distal end. Although only one slider/transducer assembly 64 of the suspension assembly 62 is shown, it will be recognized that the disk drive 50 has one slider/transducer assembly 64 for each side of each disk 56 included in the disk drive 50. The positioner arm 60 further comprises a pivot 72 around which the positioner arm 60 pivots.

The disk drive 50 further includes a read/write chip 80. As is well known in the art, the read/write chip 80 cooperates with a slider transducer assembly 64 to read data from or write data to the disks 56. A flexible printed circuit member or actuator flex cable 78 carries signals between the read/write chip 80 and a connector pin assembly (not shown) which interfaces with the external signal processing electronics.

The main function of the actuator assembly 76 is to move the positioner arm 60 around the pivot 72. Part of the actuator assembly 76 is the voice coil motor (VCM) assembly 74, which comprises a VCM bottom plate, one or more magnets, and a VCM top plate in combination with an actuator coil. Current passing through the actuator coil interacts with the magnetic field of the magnets to rotate the positioner arm 60 and suspension assembly 62 around the pivot 72, thus positioning the slider/transducer assembly 64 as desired.

Most disk drives 50 have a number of disks 56 mounted on the spindle 58 to form a disk stack 70. The actuator assembly 76 comprises a plurality of positioner arms 60 fixed in a comb-like arrangement (i.e., an E-block) such that the inner arms 65 fit between the disks 56 forming disk stack 70 and the outer arms 66, 68 extend over the top surface of the top disk and the bottom surface of the bottom disk, respectively. The inner arms 65 each support two suspension assemblies 62 (upper and lower suspension assemblies) with attached slider/transducer assemblies 64. The upper outer arm 66 supports one suspension assembly 62 with its slider/transducer assembly 64 to access data on the top surface of the top disk of disk stack 70. The lower outer arm 68 supports one suspension assembly 62 with its slider/transducer assembly 64 to access data on the bottom surface of the bottom disk of disk stack 70.

Figure 3:
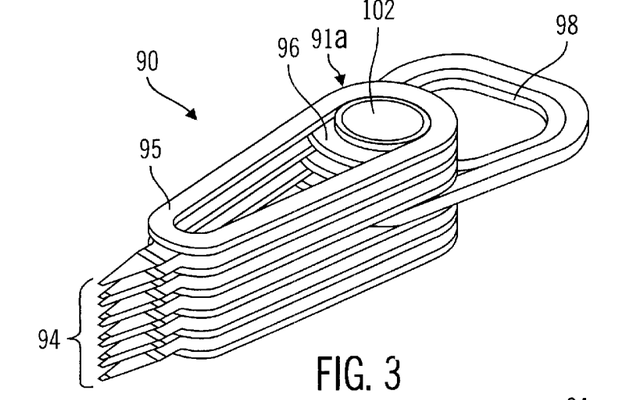
FIG. 3 is a perspective view of an E-block in accordance with one embodiment of the present invention.
Figure 4:
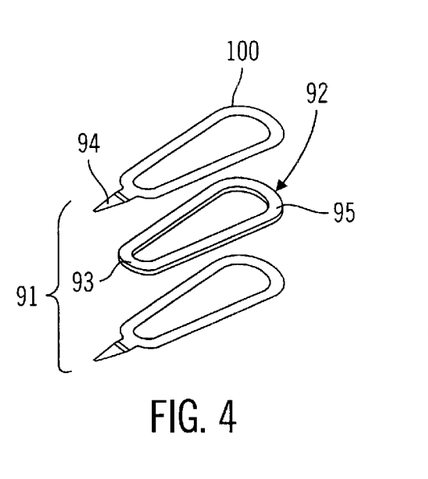
FIG. 4 is an exploded perspective view of a single actuator positioner arm in accordance with one embodiment of the present invention.
Figure 5:
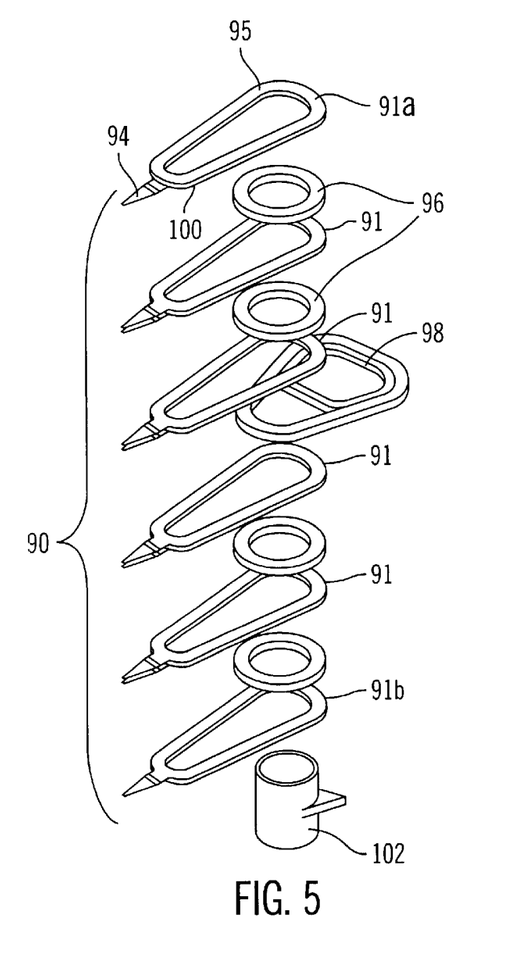
FIG. 5 is an exploded perspective view of the E-block of FIG. 3.

FIG. 3 is a perspective view of an actuator assembly 90 according to one embodiment of the present invention. Actuator assembly 90 corresponds generally to the actuator assembly 76 in FIG. 2. FIGS. 4 and 5 show exploded views of the actuator assembly 90 in FIG. 3. Specifically, FIG. 4 shows an actuator arm assembly 91 that comprises a fiber composite actuator positioner arm 92 sandwiched between two suspension members 100. The positioner arm 92 has a generally triangular or trapezoidal shape in its plane, with a wide end 95 at the pivot region and a narrow end 93 extending in the direction of the slider/transducer region. The suspension members 100 include flexible suspension 94 at the narrow end 93. Referring to FIG. 5, a number of arm assemblies 91 may be stacked together to form the actuator assembly 90 in the form of an E-block. Spacers 96 are used to define appropriate spacing between adjacent arm assemblies 91. It is noted that the top and bottom arm assemblies 91a and 91b of the stack each has only suspension member 100. The top arm assembly 91a has one suspension member 100 at the bottom of the positioner arm 92, such that it biases a slider against the top surface of the top disk in a stack of magnetic disks, and the bottom arm assembly 91b has one suspension member 100 at the top of the positioner arm 92, such that it biases a slider against the bottom surface of the bottom disk in a stack of magnetic disks. Separate arm assemblies 91 and spacers 96 can be individually wound and then bonded together to produce the stacked E-block 90. A coil assembly 98 is provided in the middle of the stack of arm assemblies 91. A barrel 102 is provided around which the arm assemblies 91, spacers 96 and coil assembly 98 are assembled. The coil assembly 98 acts as a carrier arm and the barrel 102 holds the stackable components of the E-block together.

In accordance with the present invention, to maximize the stiffness and strength, reinforcing fibers are wound in a direction along the periphery of the components, such as the positioner arm 92 or spacer 96. More specifically, fibers are wound generally in a direction along the periphery of the matrix of the components, with fibers bending around all large radii to provide winding continuity around the periphery. The substantially continuous fiber windings results in a component having a near net shape, whereby the fiber wound component requires and is subject to little to no secondary finishing operations such as cutting or machining of the fiber structure to form the periphery of the fiber wound components.

For purpose of the present invention, the use of the term "continuous" is in reference to the direction of the wound fibers around the circumference and/or periphery of the structure. This term, "continuous," also encompasses winding around the circumference and/or periphery of a structure in a manner in which fibers can cross over previously wound fibers. In other words, the fibers can be continuously wound without maintaining a substantially parallel alignment in the winding pattern. In addition, the fibers do not have to be structurally continuous to constitute a "continuous" winding for purpose of the present invention without departing from the scope and spirit of the present invention. For example, if a strand of fiber is broken during the winding process, other pieces of fibers can be wound to complete a structure of continuous fiber windings. Further, multiple strands of fibers may be wound simultaneously or alternately to complete a structure of continuous fiber windings. After winding is completed, any unintentional cut to the fiber does not invalidate the use of the term "continuous" for the purposes of the present invention.

Continuously wound fibers, not layers of unidirectional fibers, result in a stiffer E-block structure. As can be seen in further descriptions below, the continuous winding approach of the present invention can be adopted for forming various parts of an actuator assembly, not limited to the actuator arm.

The type of fibers to be used for the windings is selected based on the specific application, structure and static and dynamic performance desired. It is noted that the quality of the fibers will affect the ultimate structural integrity and performance of the component. Generally, carbon fiber is a common fiber filament that is relatively easy to work with to produce fiber composite structures, and it has good structural characteristics such as high tensile strength. Other fibers include boron, polyamide, and other natural and synthetic materials. The present invention is not limited to any particular types of fiber. While the discussion below is generally applicable to carbon fibers, it is within the scope and spirit of the present invention to use other types of fibers as alternatives or in addition to carbon fibers.

Figure 12:
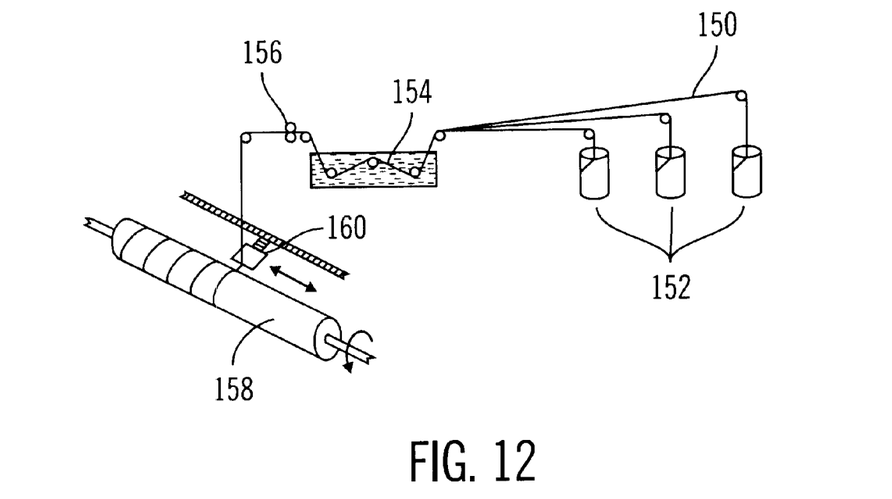
FIG. 12 is a schematic diagram of a fiber winding process.

A fiber winding process is schematically described by reference to FIG. 12. Strands of fibers 150 are unwound from spools or creels 152 (may be a different type of fiber from a different spool or creel) and drawn through a resin bath 154 consisting of either solubilized thermoplastic or uncured thermoset polymer. The resin acts as a binder for maintaining the windings in the wound structure. Excess resin is wiped off using resin-wiping rollers 156 before the fibers are wound over a mandrel 158 under tension with the aid of a guide carriage 160, to form the desired structural shape. The binder when cured becomes a matrix within which the fibers are wound. The mandrel 158 is selected of a shape that can guide the fiber winding to build up to the desired structural shape. While FIG. 12 shows a simplified form of a mandrel 158, it is understood that the mandrel or mandrels used for the actual winding process to obtain the positioner arms 92 would be of an appropriate shape and include built-in or removable guide flanges or channels, as further disclosed in the embodiments below.

Another embodiment of the present invention incorporates a dual-purpose wound-form for the positioner arm, which becomes an integral part of the positioner arm in the finished structure. The advantages of the integral, dual-purpose wound-form are (1) to act as a mandrel to guide the windings to form the desired shape as the fibers are continuously wound, and (2) to stiffen the structure by becoming incorporated in the arm. Stiffness will increase primarily in the in-plane sway direction.

Figure 6:
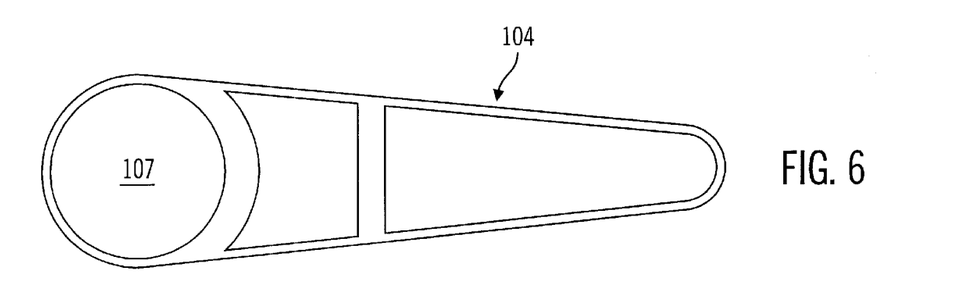
FIG. 6 is a plan view of a dual-purpose wound-form in accordance with one embodiment of the present invention.
Figure 7A:
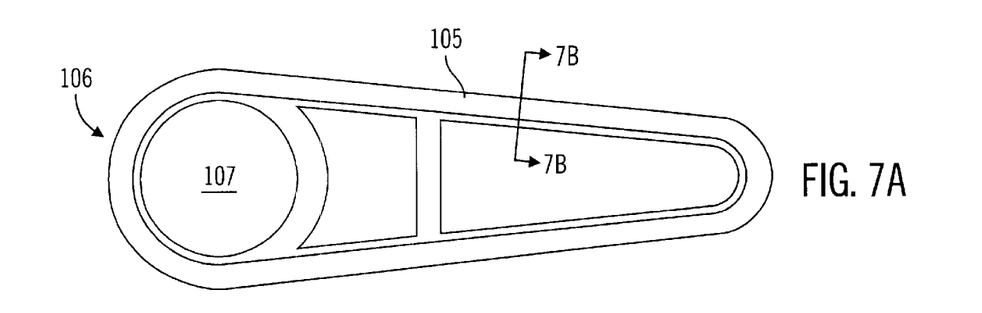
FIG. 7A is a plan view of a dual-purpose wound-form in accordance with another embodiment of the present invention.
Figure 7B:
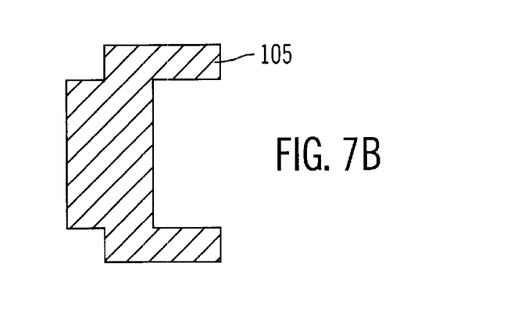
FIG. 7B is a sectional view of the wound form taken along line 7B—7B in FIG. 7A.
Figure 8:
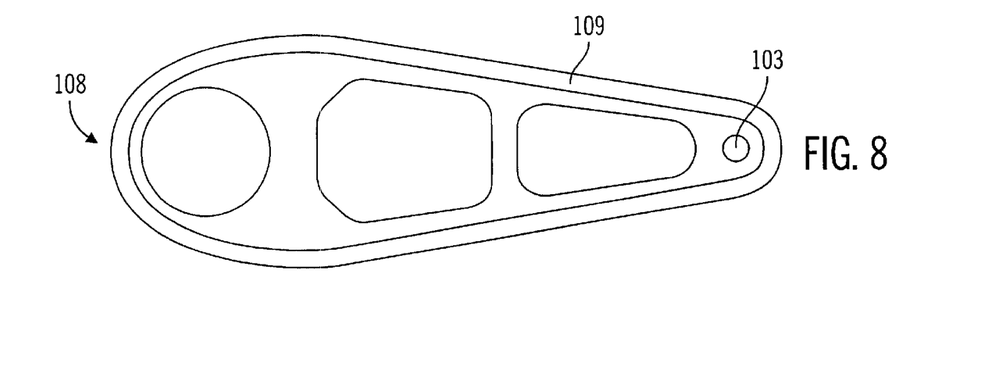
FIG. 8 is a plan view of a dual-purpose wound-form in accordance with yet another embodiment of the present invention.

FIGS. 6–8 show the plan views of different embodiments of dual-purpose wound forms. In FIG. 6, the dual-purpose wound-form 104 shows the actuator arm with a structure ready to receive a pivot assembly (e.g., comprising a bearings and a shaft) or a barrel (such as the barrel 102 in FIG. 5 which will later accept bearings and a shaft to form a pivot assembly) at opening 107. The fibers (not shown) are continuously wound around the form 104. External guides may be provided in the winding process to facilitate fiber winding. A similar dual-purpose wound-form 106 is shown in FIG. 7A, with an integral flange 105 to provide a guide to facilitate fiber winding. FIG. 7B shows the cross-sectional view along line 7B—7B in FIG. 7A of the flange structure of the wound-form. FIG. 8 shows another variation of a dual-purpose wound-form 108, which includes a flange 109 and an opening 103 for a swaging insert for attaching the slider/transducer assembly.

The wound-forms (and the mandrels used in the other embodiments) may be made of carbon, ceramic or a light, stiff metal such as aluminum, beryllium, or boron. If a polymer matrix is used for the windings, then the cured resin will bond the composite structure to the wound-form to form an overall composite structure. The wound-forms and mandrels may also be constructed from a metal matrix or polymer matrix composite.

Figure 9:
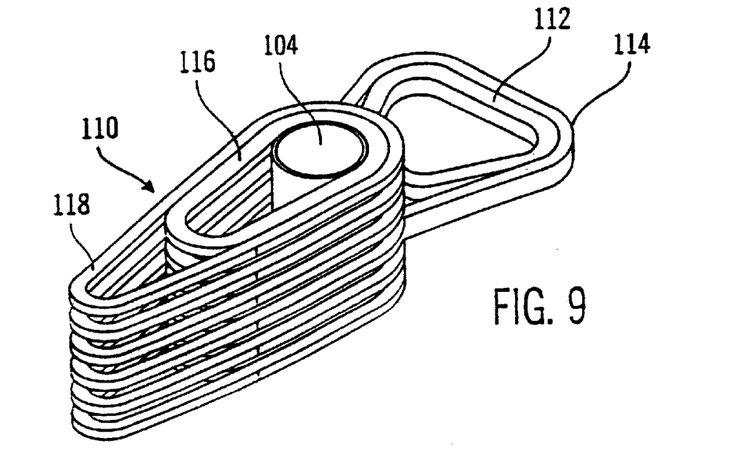
FIG. 9 is a perspective view of an E-block wound with preformed actuator components in place.
Figure 10:
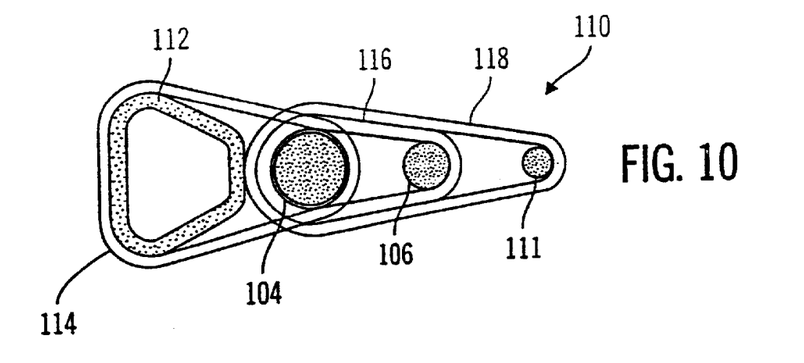
FIG. 10 is a plan view of FIG. 9, showing additional mandrels in place for fiber windings.

"FIG. 9 shows a perspective view of another embodiment of an actuator assembly 110. This embodiment is different from the embodiment of FIG. 3 in that certain preformed actuator components are used as mandrels to facilitate fiber windings, which will become integrated into the final actuator assembly in the winding process. In the embodiment show in FIG. 9, preformed coil assembly 112 and pivot bearing 104 are made an integral part of the polymer composite structure in the winding process. Since a wound multi-arm E-block is inherently weak in the thin E-block body region that separates the arms, the arm stack is strengthened to prevent cracking between arms by winding over the pivot bearing 104. The coil assembly 112 and pivot bearing 104 act as mandrels, in addition to removable mandrel 106 and mandrel 111, during the continuous winding process (see FIG. 10). In the finished structure, these actuator components are surrounded by coil support 114, inner arm 116, and outer arm 118."

Figure 11:
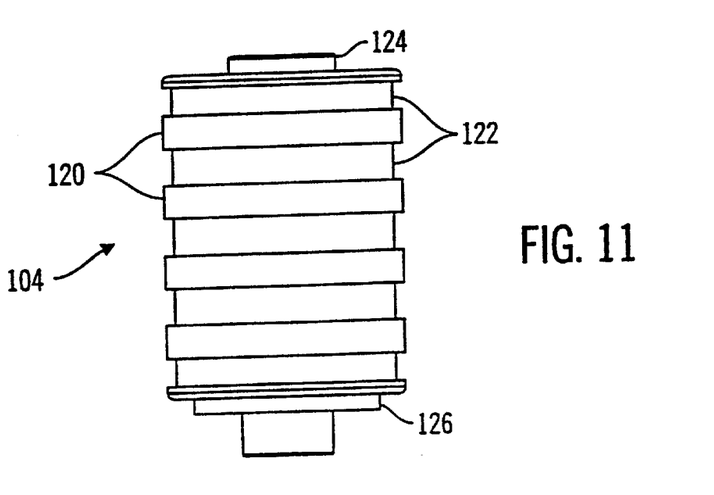
FIG. 11 is a side view of the pivot bearing of the actuator assembly in FIG. 9.

"As shown in FIG. 11, the pivot bearing 104, which comprises housing shaft 124 and flanges 126, has a series of alternating circumferential ribs 120 and grooves 122 on its cylindrical surface. The ribs 120 and grooves 122 guide the fiber windings to form the arms 116 and 118, so that the arms are properly positioned along the vertical length of the pivot bearing. Removable mandrels 106 and 111 have similar ribs and grooves in their cylindrical surface for the same purpose. Similarly, the coil assembly 112 may be provided with a frame that has a U-shaped cross-section (similar to the flanges 105 in FIG. 7B) for guiding the fiber windings around its perimeter."

"At the end of the fiber winding process, the mandrels 106 and 111 are removed, leaving the pivot bearing 104 permanently in place as an integral part of the actuator assembly 110. Instead of the mandrel 111, an insert (not shown) may be used as a mandrel during the winding process, but which is left in place in the finished structure to provide a coupling for swaging a suspension assembly and/or transducer, for example. Alternatively, the mandrels 106 and 111 may be retained in the wound structure and subsequently machined to leave behind the stiffening sections (e.g., machining to remove the core of the mandrels to leave behind a barrel structure). Instead of using the pivot bearing 104, a metal or composite sleeve may be used as a mandrel for fiber windings, which will later accept bearings and a shaft to form a pivot assembly."

Alternatively, instead of using fiber strands for the windings, the actuator assembly can be continuously wound from a fiber tape having a width equal to the thickness of the positioner arm.

In the foregoing embodiments, the individual fiber wound actuator components and the entire fiber wound actuator assembly are not subject to secondary finishing operations such as cutting or machining of the fiber structure to form the periphery of the structure. Further, the fiber wound structure may be left in its wound state as is or finished with an exterior coat of polymer material. In accordance with another aspect of the present invention, at the end of the fiber winding process, the fiber wound actuator assembly is applied as a preform, and further combined with a metal or polymer matrix to complete an E-block having fiber-reinforced metal or polymer matrix.

Figure 13:
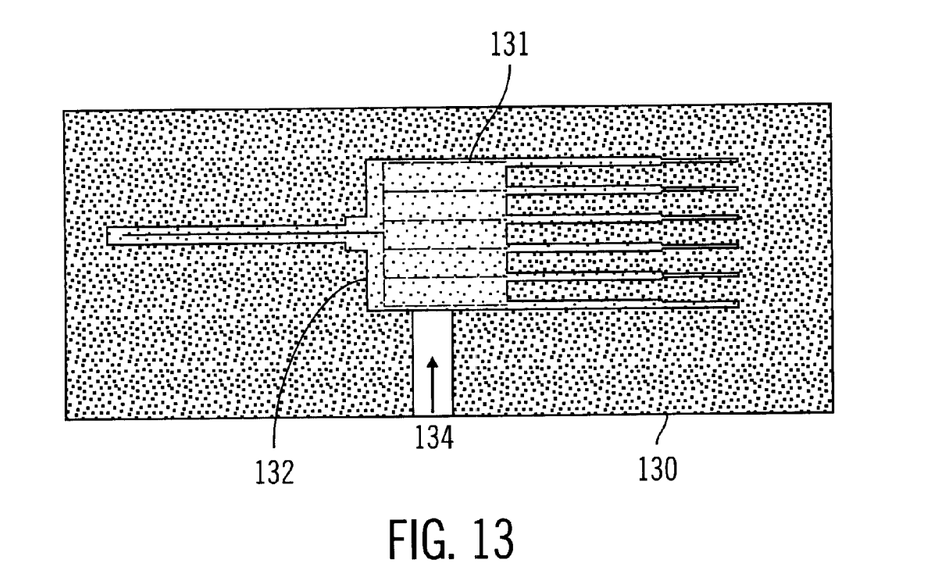
FIG. 13 is a schematic diagram illustrating a metal casting method for forming a fiber reinforced E-block in accordance with one embodiment of the present invention.

The process for making a fiber reinforced metal matrix composite E-block generally comprises the steps of placing the fiber wound preform 131 in a casting mold 130 that has a mold cavity 132 resembling the final shape of the E-block (see FIG. 13); heating the mold 130 to burn off the binder that holds the fiber windings; introducing a pressurized molten metal 134, such as aluminum, into the casting mold 130; solidifying the casting by cooling the mold 130; and ejecting the cast E-block.

Figure 20A:
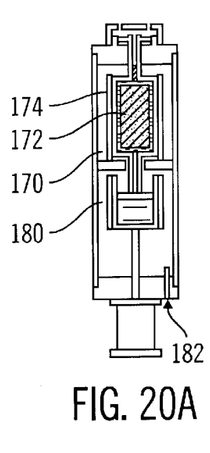
FIGS. 20A–D illustrate a pressure infusion casting process to form a metal matrix carbon fiber composite E-block in accordance with one embodiment of the present invention.
Figure 20B:
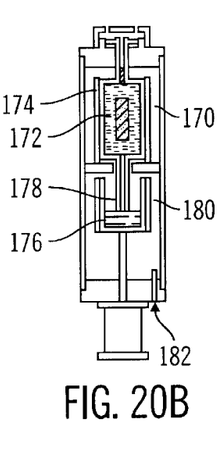
Figure 20C:
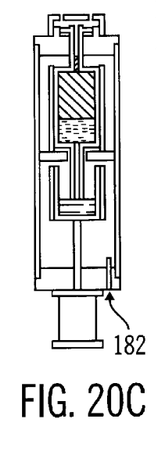
Figure 20D:
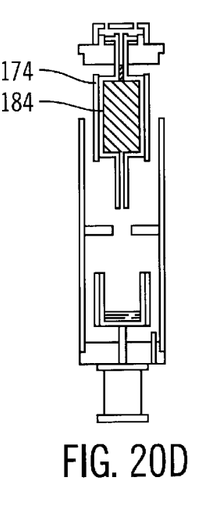

Pressure infusion casting is a specific type of metal casting process that may be adapted to cast an E-block using a fiber wound preform 172. Reference is made to U.S. Pat. No. 5,111,871 for a detail discussion of a pressure infusion casting process, which is fully incorporated by reference herein. The pressure infusion casting process may be schematically shown in FIGS. 20A–20D. The preform 172 and the casting mold 174 are heated in a chamber 170 along with a supply of metal 176 in a separate container 180 (FIG. 20A). After the metal 176 melts, pressure is applied through port 182 to force the metal 176 through a snorkel 178 into the casting mold 174 where it infuses into the porous perform 172 (FIG. 20B). The molten metal 176 penetrates the fiber wound structure, wetting the fibers and filling the voids between the fibers, similar to a wicking action. The molten metal 176 is allowed to solidify in the mold 174 (FIG. 20C). At the end of the process, a metal matrix carbon fiber composite structure 184 is formed (FIG. 20D).

To obtain maximum stiffness and strength, fibers should be coated with an appropriate diffusion barrier film during the winding process. The diffusion barrier film prevents the fiber material from reacting with the molten metal 176 to form undesirable compounds that could affect the structural integrity of the composite structure 184, and achieves proper wetting of the fibers by the molten metal 176. For example, in the case of carbon fibers and aluminum matrix, the fibers may be coated with a titanium boride film to prevent the carbon fiber from reacting with the aluminum to form brittle aluminum carbide (see U.S. Pat. No. 3,894, 863 and U.S. Pat. No. 4,145,471, which are fully incorporated by reference herein). The titanium boride coating also facilitates wetting of the wound preform surface by the molten metal aluminum matrix to bond the fiber composite to the metal matrix.

A fiber-reinforced polymer matrix composite E-block may be formed by injection molding. The preform is formed by winding fibers coated with a wax or polymer binder in a similar manner as described in connection with the embodiment of FIG. 3 or 9. The wound preform is placed in a mold similar to the mold 130 in FIG. 13, and polymer is injected into the mold to over-mold the preform by conventional injection molding processes to form the fiber-reinforced polymer E-block. The mandrels used in the winding process may be provided with inserts (at the winding surfaces of the mandrels) that are retained in the completed wound structure to increase stiffness and to provide a mounting surface for other actuator components or head gimbal assembly. Alternatively, the mandrel may be retained in the wound structure by the molding step, and subsequently machined to leave behind the stiffening sections (e.g., machining to remove the core of a mandrel to leave behind a pivot bearing barrel).

Advantages of a fiber-reinforced metal matrix composite over a polymer matrix composite include: (a) combination of high tensile strength and modulus of elasticity of a fiber with structural stiffness of metals, thus achieving good strength-to-weight ratio; (b) good electrical grounding; and (c) local ductility for swaging other components (e.g., a head gimbal assembly) to the composite component (e.g., the positioner arm).

It is noted that for the fiber reinforced polymer and metal matrix composite E-blocks, if desired the polymer and metal matrix may be machined to finish the periphery of the structure or define features on the periphery after completion of casting. This secondary finishing operation does not depart from the scope and spirit of the present invention, as long as it does not involve substantially cutting or machining the fiber structure.

It can be appreciated that the above described approaches to forming E-blocks or components thereof preclude the need to machine the fiber structure to achieve the desired geometry, such as a monolithic composite block to achieve the final E-block geometry. With this invention, the continuous fiber windings eliminate cut fibers that create structural weaknesses, especially at locations prone to relatively high stresses. Another advantage is that an E-block or components thereof formed in accordance with the present invention is a cleaner structure as continuous fiber composites generate much less particulate contamination compared to cut fiber composites that shed particles of broken carbon fibers. Since carbon fibers are very abrasive to machine, a near net shape E-block would minimize the associated expense of cutting tool wear and machining time.

Another advantage of the continuous wound fiber composite actuator of the present invention is the higher out-of-plane bending stiffness and in-plane bending stiffness. The higher out-of-plane bending stiffness will increase the hard disk drive's shock resistance in the z-axis by reducing out-of-plane bending of the arm. This will minimize incidence of head slapping or arm slapping against the disk's delicate magnetic coating. The higher in-plane (or sway mode) bending stiffness improves the dynamic response of the actuator due to reduced excitation by various resonant modes by shifting the resonance of the various modes to higher frequencies. For example, higher in-plane stiffness reduces the undesirable low amplitude side-to-side motion of the actuator arm by shifting the first main resonant mode, or the butterfly mode, to a higher frequency. This will result in less track misregistration (TMR) because the read-write head will not swing as far off track in a side-to-side motion and any such motion will be at a higher frequency. Increasing the composite actuator's butterfly mode potentially increases the servo bandwidth proportionally. Similarly, other resonant modes (such as the S-mode, M-mode, and end arm mode) will occur at significantly higher frequencies. At these high frequencies, the various arm modes contribute to TMR by forcing the heads to move off track. TMR can increase when the arm modes interact with the disk stack modes if they are at the same frequencies. The present invention with increased stiffness and decreased mass could potentially improve the servo bandwidth from 100 to 700 Hz, or even better improvements depending on the particular E-block designs.

Figure 14:
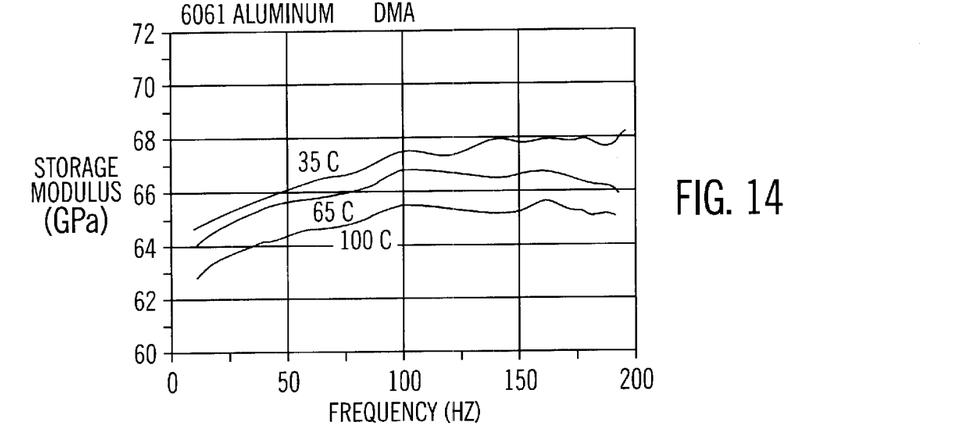
FIG. 14 is a graph illustrating the relationship of storage modulus and frequency of an aluminum test coupon.
Figure 15:
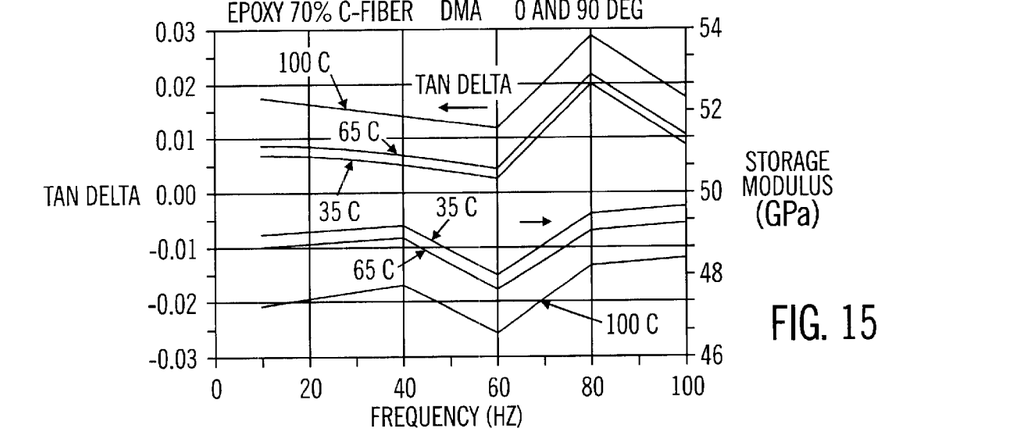
FIG. 15 is a graph illustrating the relationship of storage modulus, damping (tan delta) and frequency of a bi-directional carbon fiber composite test coupon.
Figure 16:
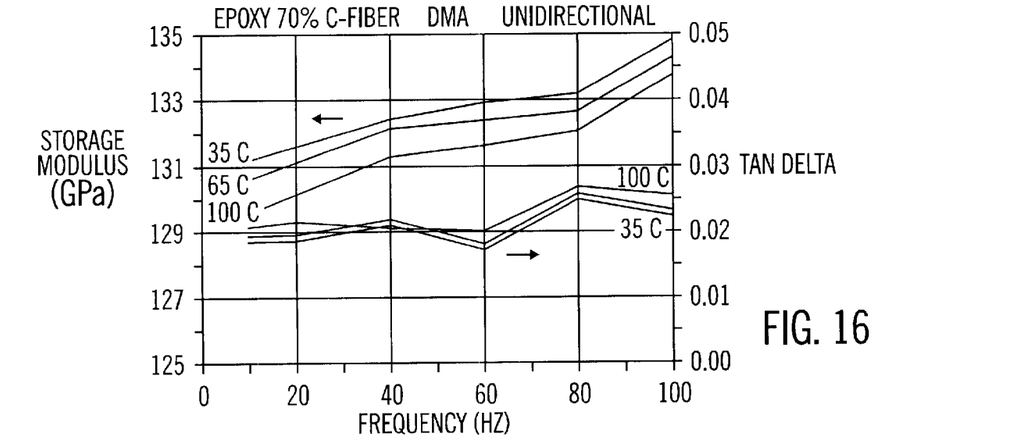
FIG. 16 is a graph illustrating the relationship of storage modulus, damping (tan delta) and frequency of a unidirectional carbon fiber composite test coupon.

FIGS. 14–16 illustrate the characteristics of out-of-plane stiffness (which directly correlates to storage modulus), damping and frequency relationships for aluminum, a bi-directional carbon fiber composite and a unidirectional carbon fiber composite based on coupon level test data obtained at 35° C., 65° C. and 100° C. FIG. 14 shows that the storage modulus of aluminum at the three different test temperatures is found to lie between 63 and 68 GPa. FIG. 15 shows that the storage modulus of a bi-directional (at 0 and 90 degrees) carbon fiber composite (70% fill in epoxy matrix) at similar temperatures lies between 47 and 49.5 GPa. FIG. 16 shows that the storage modulus of a unidirectional carbon fiber composite of same percentage of fill in epoxy matrix lies between 129.5 and 135 GPa. As one can appreciate from the data, the storage modulus of the unidirectional composite has more than double the stiffness than the bi-directional composite. One can expect the resonant frequency of the unidirectional composite to be at least 40% higher than that of the bi-directional composite (as indicated by the experimental data in FIGS. 17 to 19 below). Further, the unidirectional composite has higher damping (tan delta) than the bi-directional composite, which further improves dynamic performance of the actuator. The damping capacity of composite is expected to be 2–10 times the damping capacity of aluminum.

Figure 17:
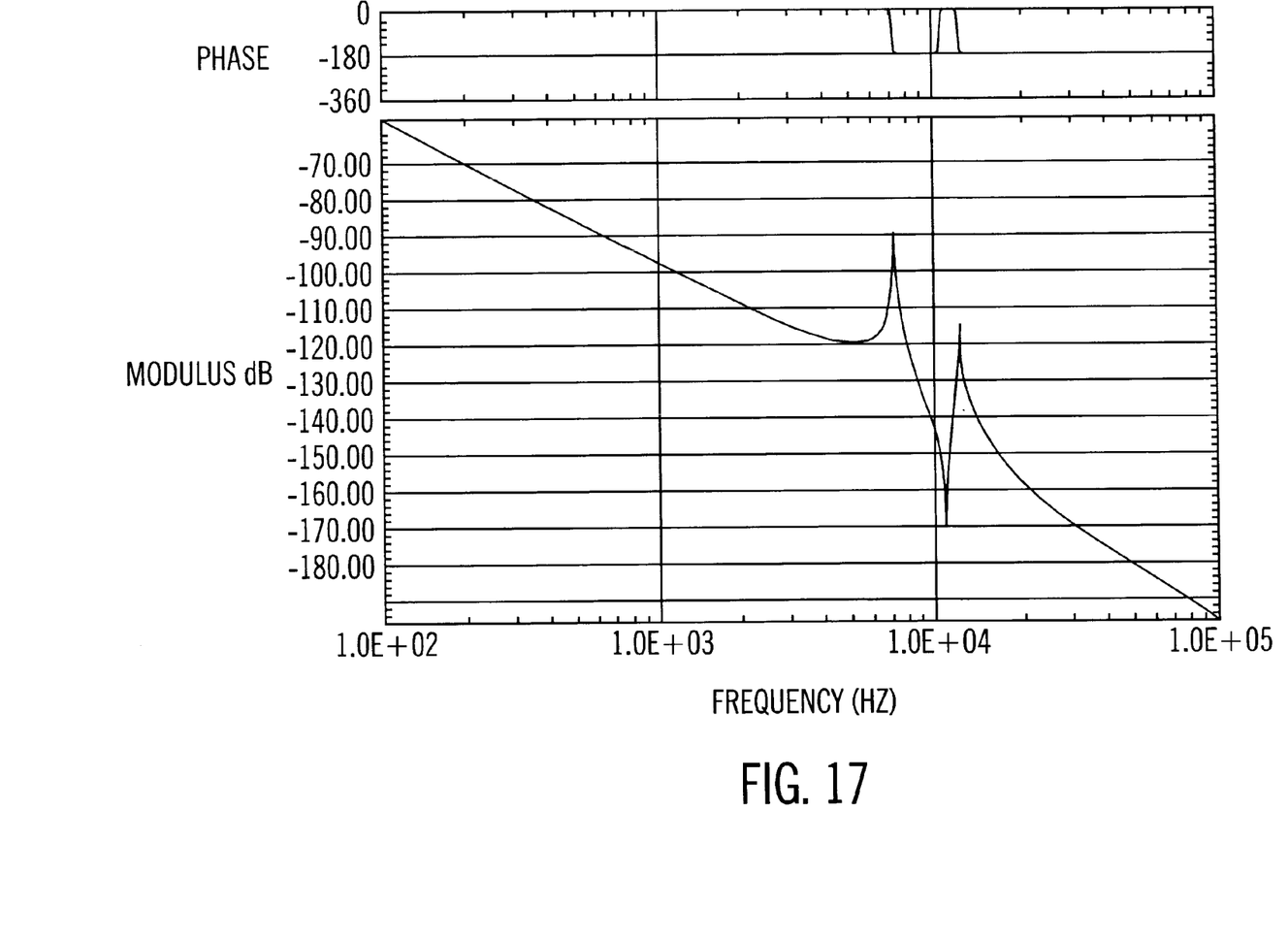
FIG. 17 is a graph illustrating the mechanical transfer function data for a unidirectional E-block obtained from finite element modeling.
Figure 18:
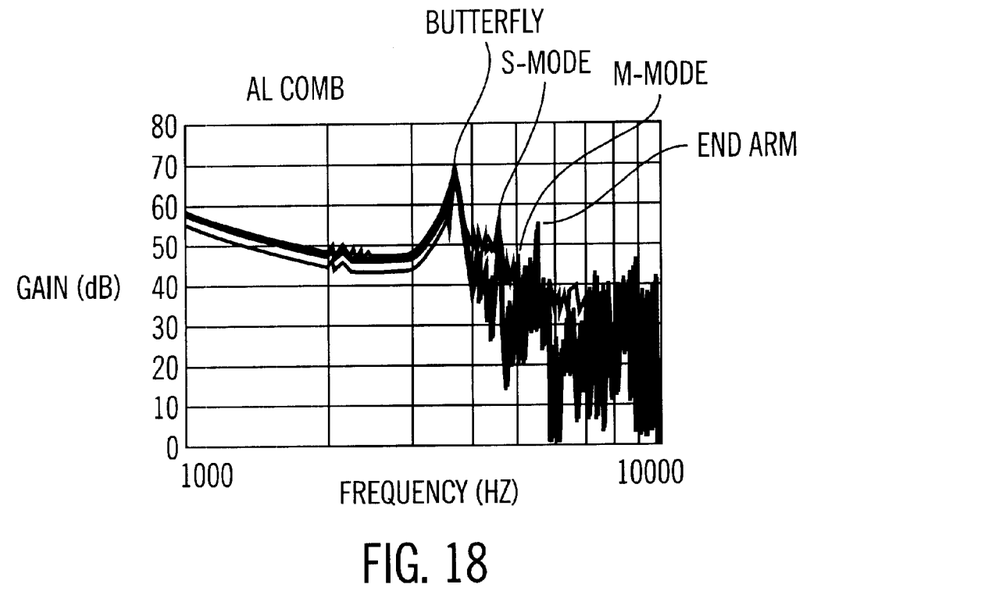
FIG. 18 is a graph illustrating the mechanical transfer function data of an aluminum E-block.

FIG. 17 shows the mechanical transfer function data obtained from a finite element modeling of the response to actuator coil current generated forces for a monolithic six-arm, continuous carbon fiber wound, 70% filled, polymer composite E-block formed by injection molding in accordance with the present invention. With a mass of 7.4 grams and a rotational inertia of 1985 gram-mm$^2$, the butterfly mode of the actuator assembly formed by the present invention is at 7000 Hz. Comparing to FIG. 18, the butterfly mode of a standard aluminum six-arm E-block is at 3500 Hz. The shift in resonance peaks to higher frequencies for the continuous carbon fiber wound composite E-block results in increased bandwidth of the actuator servo system.

Figure 19:
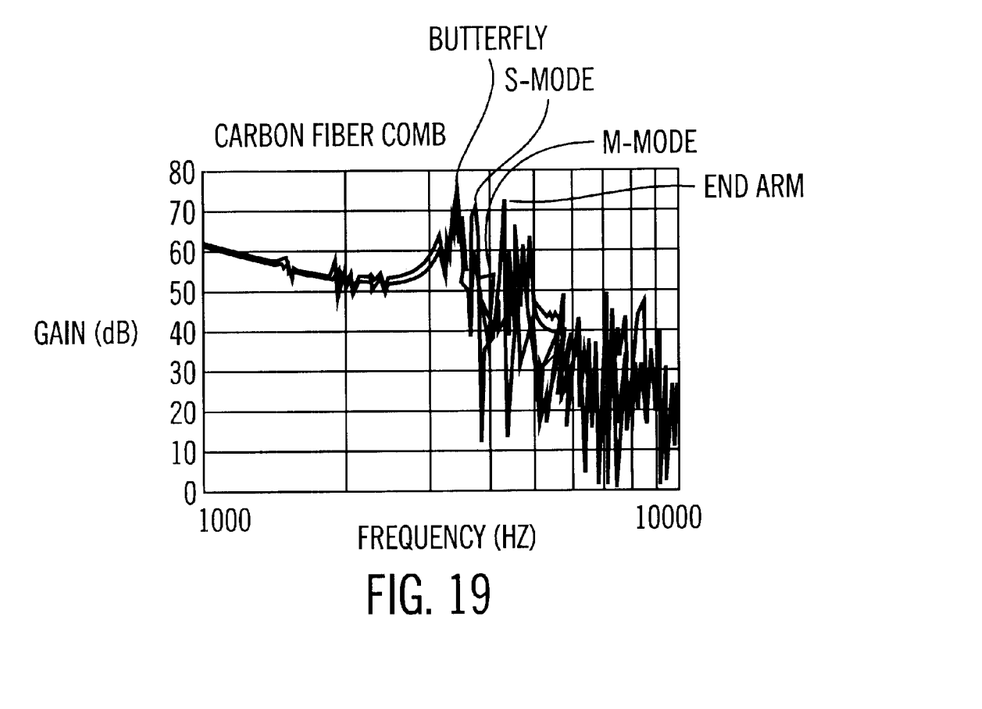
FIG. 19 is a graph illustrating the mechanical transfer function data of a bi-directional, 70% carbon fiber composite E-block.

Comparing to FIG. 19, the butterfly mode of a bi-directional, 70% bi-directional carbon fiber composite six-arm E-block is at 3300 Hz, which is no improvement over aluminum. The butterfly mode frequency increase of the present invention would be lower than 3500 Hz and as low as 2400 Hz. The continuous carbon fiber wound structure of the present invention clearly provides a superior dynamic response of the actuator servo system compared to the bi-directional composite structure. Further, the continuous carbon wound fiber composite actuator of the present invention does not have the weaknesses of the bi-directional layers and trimmed fibers that are found in the prior art fiber composite actuators.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An actuator assembly for a magnetic storage system, comprising:
   at least one actuator arm assembly having a fiber composite structure comprised of fibers in a matrix, wherein substantially all the fibers are wound generally in a direction along a periphery of the matrix; and
   a pivot member supporting said at least one actuator arm assembly for attachment to a magnetic storage system.

2. The actuator assembly as recited in claim 1 wherein the fibers are substantially continuously wound within the matrix.

3. The actuator assembly as recited in claim 1 wherein the fiber composite structure of the actuator arm assembly has an opening for receiving the pivot member.

4. The actuator assembly as recited in claim 1 comprising a plurality of actuator arm assemblies each having said fiber composite structure, wherein the plurality of actuator arm assemblies are structurally coupled together by the pivot member.

5. The actuator assembly as recited in claim 4 wherein the matrix of the fiber composite structure includes a material that is cast or molded to form a monolithic structure.

6. The actuator assembly as recited in claim 1 wherein the fiber comprises carbon material.

7. The actuator assembly as recited in claim 1 wherein the matrix comprises at least one of a polymeric material or metal material.

8. The actuator assembly as recited in claim 1 wherein the fiber composite structure further comprises a form defining generally the geometry of the fiber composite structure, around which the fibers are wound, whereby the form is wound in place as an integral part of the fiber composite structure.

9. The actuator assembly as recited in claim 8 wherein the form comprises integral flanges for guiding fiber windings.

10. An actuator assembly for a magnetic storage system, comprising:

at least one actuator arm assembly having a fiber composite structure comprised of fibers in a matrix, wherein the fibers are wound generally in a direction along a periphery of the matrix, wherein the fiber composite structure is substantially near net shape, which requires substantially no cutting of the fibers to form the periphery of the structure; and a pivot member supporting said at least one actuator arm assembly for attachment to a magnetic storage system.

11. An actuator assembly for a magnetic storage system, comprising:

a plurality of actuator arm assemblies each having a fiber composite structure comprised of fibers in a matrix, wherein substantially all the fibers are wound generally in a direction along a periphery of the matrix; and a pivot member for structurally coupling the actuator arm assemblies and attachment to a magnetic storage system, wherein the pivot member comprises a generally cylindrical surface having a plurality of grooves that define locations for fiber windings for the plurality of actuator arm assemblies such that the plurality of actuator arm assemblies are spaced apart along the cylindrical surface at a spacing defined between adjacent grooves.

12. The actuator assembly as recited in claim 11 wherein the pivot member and the plurality of actuator arm assemblies is an integral structure in which the fiber composite structures of the plurality of actuator arm assemblies are coupled to the pivot member, whereby the pivot member is wound in place.

13. An actuator assembly for a magnetic storage system, comprising:

at least one actuator arm assembly having a fiber composite structure comprised of fibers in a matrix, wherein the fiber composite structure is substantially near net shape, which requires substantially no cutting of the fibers to form the periphery of the structure; and a pivot for attachment to a magnetic storage system.

14. An actuator assembly for a magnetic storage system, comprising:

a monolithic fiber composite body comprising a plurality of actuator arms; wherein the actuator arms each has a structure in which substantially all the fibers are wound generally in a direction along a periphery of the structure; and a pivot supporting said plurality of actuator arms for attachment to a magnetic storage system.

15. The actuator assembly as recited in claim 14 wherein the fiber composite body comprises fibers in a molded matrix of at least one of polymer or metal material.

16. A magnetic storage system, comprising:

a magnetic storage medium with a data surface of concentric data tracks;

a motor drive for rotating the storage medium;

a slider including a read/write transducer maintained in operative relationship with the data surface when the magnet storage medium is rotating;

an actuator assembly coupled to the slider for pivotally positioning said slider relative to the magnetic storage medium to selected tracks on the data surface, the actuator assembly comprising at least one actuator arm assembly having a fiber composite structure comprised of fibers in a matrix, wherein substantially all the fibers are wound generally in a direction along a periphery of the matrix; and an electronics module for controlling the operations of the motor drive and actuator assembly and processing data read from and written to the data surface.

17. A method of making an actuator assembly for a magnetic storage system, comprising the steps of:

forming at least one actuator arm assembly of a fiber composite structure comprised of fibers in a matrix, by winding substantially all the fibers generally in a direction along a periphery of the matrix; and providing a pivot member to support said at least one actuator arm assembly for attachment to a magnetic storage system.

18. The method as recited in claim 17 further comprising the steps of forming a plurality of actuator arm assemblies each having said fiber composite structure;

structurally coupling the plurality of actuator arm assemblies together using the pivot member.

19. The method as recited in claim 17 wherein the step of forming the actuator arm assembly comprises the step of casting or molding the fiber composite structure to form a monolithic structure of fibers in a matrix.

20. A method of making an actuator assembly for a magnetic storage system, comprising the steps of:

providing a pivot member for winding and attachment to a magnetic storage system;

forming a plurality of actuator arm assemblies each having a fiber composite structure comprised of fibers in a matrix, by winding fibers about the pivot member, into an integral structure in which the fiber composite structures of the plurality of actuator arm assemblies are attached to the pivot member, whereby the pivot member is wound in place.

21. The method as recited in claim 20 wherein the pivot member comprises a generally cylindrical surface having a plurality of grooves that define locations for fiber windings for the plurality of actuator arm assemblies such that the plurality of actuator arm assemblies are spaced apart along the cylindrical surface at a spacing defined between adjacent grooves.

22. A method of making an actuator assembly for a magnetic storage system, comprising the steps of:

forming at least one actuator arm assembly of a fiber composite structure comprised of fibers in a matrix, by winding fibers generally in a direction along a periphery of the matrix to form the fiber composite structure that is substantially near net shape, which requires substantially no cutting of the fibers to form the periphery of the structure; and providing a pivot member to support said at least one actuator arm assembly for attachment to a magnetic storage system.

23. A method of making an actuator assembly for a magnetic storage system, comprising the steps of:

forming at least one actuator arm assembly of a fiber composite structure comprised of fibers in a matrix, by winding the fibers around a form defining generally the geometry of the fiber composite structure, whereby the form is wound in place as an integral part of the fiber composite structure; and providing a pivot member to support said at least one actuator arm assembly for attachment to a magnetic storage system.

24. An actuator assembly for a magnetic storage system, comprising:

a monolithic, compositive body of a fiber reinforced matrix in which substantially all fibers are wound generally in a direction along a periphery of the matrix, the composite body including a plurality of actuator arms; and a pivot for attachment to a magnetic storage system.

25. The actuator assembly as in claim 24, wherein the monolithic, composite body comprises fibers molded or cast in a metal or polymer matrix.

* * * * *